June 11, 1968 R. S. CARTER 3,388,264

NANOSECOND CIRCUIT FOR ELIMINATING CAM BOUNCE

Filed May 1, 1964

INVENTOR
RICHARD S. CARTER

BY Melvin P. Williams

ATTORNEY

United States Patent Office 3,388,264
Patented June 11, 1968

3,388,264

NANOSECOND CIRCUIT FOR ELIMINATING CAM BOUNCE

Richard S. Carter, Poughkeepsie, N.Y., assignor to International Business Machines Corporation, New York, N.Y., a corporation of New York Filed May 1, 1964, Ser. No. 364,248
10 Claims. (Cl. 307—93)

ABSTRACT OF THE DISCLOSURE

Disclosed is a nanosecond logical circuit for isolating relatively slow, noisy switching circuits (e.g., cam-operated contacts) from a very fast system. Isolation is achieved through a pair of latches which are interlocked through a timed signal. The latches operate in response to initial input change in voltage, but thereafter, they are unresponsive to other changes in voltage such as those introduced by cam bounce or other noise sources. If the circuit is switched on by a noise pulse, it will stay on for a timed period, or if it is switched off, it will stay off for a timed period.

This invention relates to circuits for eliminating noise signals resulting from cam contact opening and closing, and more particularly to such a circuit which may employ logic having operating times in the nanosecond range.

In the data processing art, the use of mechanical cams has been relied upon for achieving synchronization between mechanical motion and electric circuitry in a great variety or applications. Following the development of the electronic computer, electron tube circuits were developed to respond to the opening and closing of cam contacts, thereby avoiding the direct use of the contacts to control various related circuitry; this is necessary due to the imperfections in signals which result from the opening and closing of the cam. The noisy signal characteristics of cam contacts is commonly referred to as "contact bounce." As the electronic computer art developed for implementation in semi-conductor technology, circuits were perfected, and implemented with semiconductors, so as to permit the use of mechanical cams with high speed semiconductor computer circuits.

Recent advances in semiconductor circuitry, and in solid logic technology for computers generally, have resulted in logical circuits (such as AND, OR and EXCLUSIVE OR circuits) capable of operating at speeds of five nanoseconds (ten to the minus ninth seconds, or mili-micro seconds), more or less. At these speeds, it has been found that circuit arrangements previously suitable for responding directly to cam contacts are subject to oscillations due to the fact that the variation in cam contact voltage signals with respect to time is quite slow when compared with the response time of present-day, nanosecond logical circuitry.

Therefore, it is the primary object of the present invention to provide a circuit for eliminating cam contact noise which is capable of responding in a few nanoseconds.

A further object of the present invention is to provide a cam contact isolation circuit which utilizes nanosecond logical circuits to an advantage in achieving the isolation of the cam from other circuitry in a system, said circuit being independent of the time characteristics of said logic circuits.

In accordance with the present invention, there is provided a circuit comprising a pair of latches which operate in such a fashion as to render the output of said circuit responsive to initial changes in voltage from a cam contact, but unresponsive to the noise, or bounce effects, of said contact, in a manner which is independent of the response times of the latches and related circuits.

The invention permits the combination, in a single system of relatively slow, mechanically-actuated cam contacts and very high speed, nanosecond circuitry, without the danger of oscillations, or other noise feed-through, occurring in said circuitry.

Figure 2:
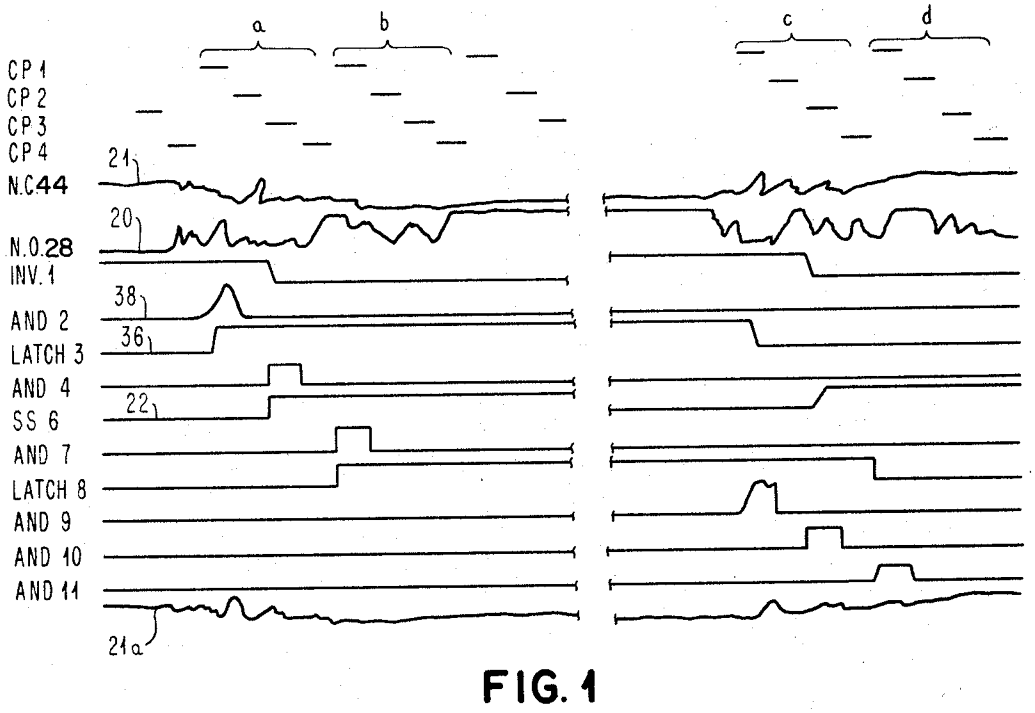
Figure 1:
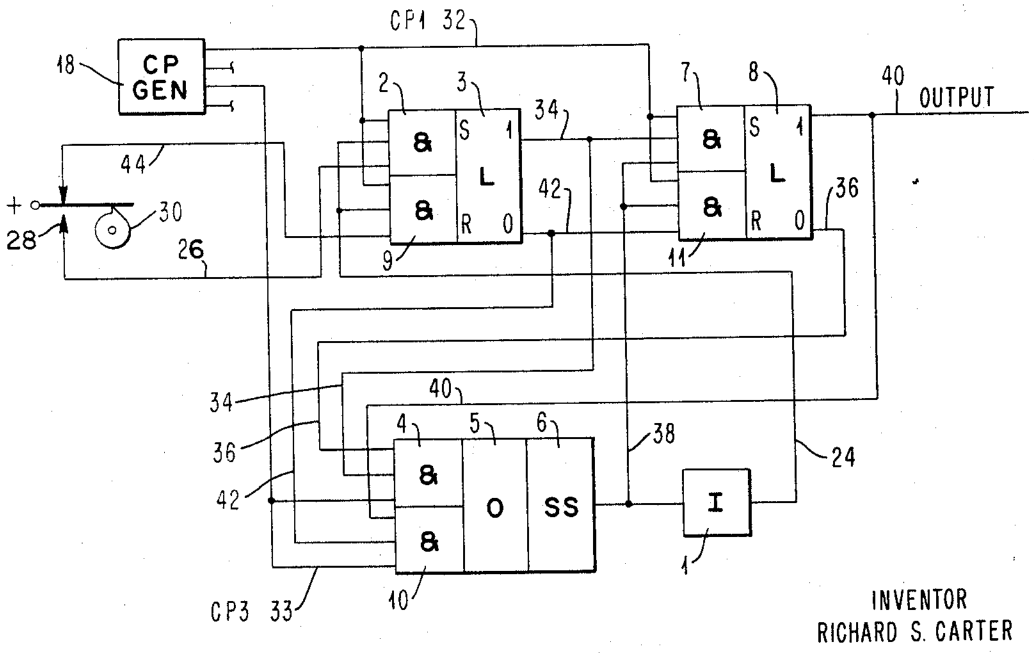

Other objects, features and advantages of the present invention will become apparent with respect to the following, more particular description of an illustrative embodiment thereof, as shown in the accompanying drawing, of which FIG. 1 is a schematic block diagram of an illustrative embodiment and FIG. 2 is a chart illustrating the typical operation of the circuit of FIG. 1.

The timing of the chart of FIG. 2, and operation of the circuit of FIG. 1, is subdivided by a plurality of clock pulses CP1–CP4, which repeat in successive "cycles." These may be generated by a circuit 18 (FIG. 1) as shown in FIG. 308 a copending application of Richard S. Carter and Walter W. Welz entitled "Parallel Memory, Multiple Processing, Variable Word Length Computer," filed Dec. 23, 1963, Ser. No. 332,648, assigned to the same assignee as this application. Letters *a–d* are used to distinguish earlier times CP1–CP4 from later times CP1–CP4.

Referring briefly to FIG. 2, the turning on and turning off of a cam is illustrated by the waveform 20 as varying with respect to time during initial time intervals, and until a time (such as time CP3*b*) when the contact has finally settled into a steady conducting condition (or non-conducting condition in the case of opening of the contact). It is the purpose of the present invention to convert the time varying signal into a clean, step function signal such as that shown by waveform 22 (in the middle of FIG. 2).

Referring now to FIG. 1, an inverter 1 will supply a NOT SS signal (not single shot signal) on a line 24 for application to an AND circuit 2 whenever the circuit is at rest (either with the associated cam open or the associated cam closed). A normally open contact 28 of a cam 30 is connected to the input of AND circuit 2, which is also responsive to a timing signal CP1. Assuming that the cam 30 commences to close the contact 28, noise potential (such as that shown at the left hand end of waveform 20 in FIG. 2) will begin to appear on a line 26. At a time CP1, if sufficient noise is present (or at a later time CP1 when sufficient noise is present) the AND circuit will finally be operative so as to supply a signal to set a latch 3, the output of which comprises a signal on a line 34. Thus, as shown by the waveform 36 in FIG. 2 the output of the latch 2 will appear at time CP1(*a*) in response to operation of the AND circuit 2, however brief this may be, as illustrated by waveform 38.

Once the signal is available on line 34, it supplies an input to an AND circuit 4, which will be operative at the next time CP3 (during cycle *a*) in response to a signal on line 33, due to the fact that a signal will be present on a line 36, as described hereinafter. The output of the AND circuit 4 is passed through an OR circuit 5 to energize a single shot circuit (SS)6, which may be a monostable multivibrator or any other circuit capable of delivering an output on a line 38 for a determinable length of time, as is well known in the art. With the appearance of the signal on line 38, the inverter 1 will no longer develop the NOT SS signal on line 24, so that the AND circuit 2 can no longer respond to the normally open signal on line 26. Thus, noise on the normally closed contacts (see waveform 21, FIG. 2) will not effect the latch 3 once it is set due to the isolation of the latch from the contacts by means of the absence of the NOT SS signal on line 34.

The presence of the SS signal on line 38 concurrently with the presence of the CAM closed signal on line 34 will cause an AND circuit 7 to be operative at time CP1 of the next timing cycle (*b*). The AND circuit 7 will therefore set a latch 8 at the following time CP1(*b*), to generate a signal on a line 40. When the latch 8 is set, it will no longer develop the signal on line 36 so that AND circuit 4 will be rendered inactive and the single shot 6 will not again be energized as a result of the signal being present on line 34 at the input to AND circuit 4. Notice that the OR circuit 5 also responds to another AND circuit 10, which is not operative at this time due to the absence of a signal on a line 42 from the latch 3, which signal can never be present when the latch is set. Thus, only a single energization of the single shot 6 will occur as a result of the normally open contact 28 of the cam 30 starting to close.

After the single shot 6 has timed out, the timing out of which is made to be long enough to out-last all of the possible noise from the cam 30, the signal on line 38 will disappear, and the signal on line 24 will again be available, so that there will be an input to an AND circuit 9, rendering the AND circuit 9 responsive to the normally closed contact 44 of the cam 30. Thus, with the normally open contact of the cam firmly closed, and the single shot 6 having timed out, the circuit of FIG. 1 temporarily assumes a condition with the latch 3 set on, the latch 8 set on, the AND circuit 4 and 10 blocked (by the absence of signals on lines 36 and 42), and the AND circuits 7 and 11 blocked (by the lack of a signal on line 38).

Referring briefly to the right hand half of FIG. 2, waveform 20 illustrates what happens when the normally open contact 28 begins opening again. Control of the circuit of FIG. 1 is changed to the normaly closed contact 44 in terms of recognizing that the normally open contact 28 is again becoming open. However, this could be achieved by inverting the voltage on the line 26 and applying that to the AND circuit 9 rather than having AND circuit 9 connnected to the normally closed contact 44. In either case, the presence of the signal input to the AND circuit 9 from the cam 30 will have the same effect on the AND circuit 9 as did the input to the AND circuit 2 from the contact 28, as described hereinbefore. Since the single shot has timed out, there will be a signal from the inverter 1 on line 24 so that at time CP1(*c*), the AND circuit 9 will reset latch 3. This will eliminate the signal on line 34, and cause a signal to appear once again on the line 42. Thus, the opening of contact 28 is manifested in the disappearance of the signal on line 34 and the reappearance of the signal on line 42, in response to the simultaneous closing of contact 44.

When the signal appears on line 42, it will be applied to the AND circuit 10, which also has supplied to it the signal on line 40. Thus, at the following time CP3 (in cycle *c*), the AND circuit 10 will send a signal through the OR circuit 5 to energize the single shot 6, thereby causing a signal to appear on line 38, and also causing the inverter 1 to stop generating the signal on line 24. The presence of the signal on line 42 in combination with the signal on line 38 will cause an AND circuit 11 to operate at the following time CP1, which is in cycle *d*, to reset the latch 8, thereby causing the signal to appear once again on line 36, and causing the OUTPUT signal to disappear from line 40.

The disappearance of the signal from line 24 renders the AND circuit 2 unresponsive to any possible noise signals that might appear on the line 26 as a result of the opening of the contact 28, whereby the latch 3 is isolated from the cam 30 as soon as the single shot 6 starts its time out.

The resetting of the latch 8 is the last active step in a cycle of closing and re-opening the cam. The single shot 6 is not yet timed out simply because there is a possibility of noise appearing from the cam, and the single shot is given a time period long enough to permit the cam to reach a steady state before the single shot times out.

It is to be noticed that the circuit output is the output of the latch 8, and control over the setting and resetting of this latch resides in part in the single shot 6, and resides in part in the latch 3. In other words, with the latch 8 initially off, the AND circuit 4 will control setting of the single shot; with the latch 8 initially on, the AND circuit 10 will control the setting of the single shot. It is to be noticed that the latch 3 is set instantaneously, with hte intervention only of one AND circuit (2 or 9) in order to reflect the operation of the cam directly in an electronically generated signal on one of the lines 34, 42.

What has been described is the normal, straight-forward operation of the circuit. It may be observed, that the latch 3 became set at time CP1(*a*), and stayed set until time CP1(*c*). This was so because noise on the normally closed contact 44 (waveform 21, FIG. 2) was assumed to not be sufficient to gate the AND circuit 9 and thereby reset the latch 3. However, if, at a time *during* time CP1(*a*), *after* the time when the latch 3 was set, there appeared a spike of noise from the contact 44 to the AND circuit 9 (as illustrated in waveform 21*a*, bottom of FIG. 2), then the latch 3 could be reset during this latter part of CP1(*a*). Thus, the output of the latch 3 could propagate noises to electronic circuits, if the line 34 were utilized as the output of the CAM CONTROL circuit. For this reason, the second latch 8 is provided, and further, the single shot 6 is caused (by AND circuit 4) to start to time out at time CP3(*a*), *only* if the latch 3 is still set at that time: note that CP3 is isolated from CP1 by CP2, so there is *no* possibility of an overlapping of signals which would permit the single shot 6 to begin to time out with a possibility of the latch 3 being reset immediately thereafter. In other words, the latch 3 *must* be irrevocably set, and the timing signal inputs to the AND circuits 2, 9 removed, *prior* to the time when the output of the latch 3 may be utilized to energize the single shot 6. The single shot must be started, so as to provide an output on line 38 *before* there is any possibility of setting the latch 8. Again, the setting of the latch 8 is isolated from the initiating of the single shot time out, since it must be set at a time CP1 which follows the particular time CP3 within which the single shot 6 is started: this second time CP1 is isolated from CP3 by the time CP4.

In summation, the circuit of FIG. 1 guarantees that the output of latch 8 *will stay on if it goes on at all*, and *will stay off if it goes off at all*, without interference from noise signals on either contacts of the cam 30.

This is achieved by means of the single shot which completely blocks the input to latch 3, and enables the input to latch 8; the single shot itself is prevented from coming on until the latch 3 is assuredly set (during time CP3).

As mentioned hereinbefore, a single cam contact could be serviced by this circuit if an inverter were used to connect it to the AND circuit 9. In fact, a single contact is more susceptible to noise, so that the advantages of the circuit in accordance with this invention become of even greater value when used therewith.

Additionally, it should be obvious that the single shot 6 can be a variety of time characteristics which are greatly in excess of the minimum required to isolate the circuit from cam contact noise. For instance, if a 10 degree cam were available, but 60 degrees of cam closure were required, the single shot could be set to equal the time period required for 60 degrees of revolution of the cam.

Further, the signals on line 34 and 38 could be combined in an AND circuit so as to develop an indication that the cam has just closed, and the signals on line 42 and 38 could be combined in an AND circuit to indicate that the cam has just opened. This would permit control over circuitry which may be interested in only the amount of closing or opening, rather than the general fact of being opened or closed (as indicated by the OUTPUT signal on line 40).

While the invention has been particularly shown and described with reference to a further embodiment thereof, it will be understood by those skilled in the art that various changes in form and details may be made therein without departing from the spirit and scope of the invention.

What is claimed is:

1. A control apparatus for a temporarily noisy signal line, comprising:

a signal line means for presenting a first signal in dependence upon a first condition and a second signal in dependence upon a second condition;

a control means capable of assuming either one of two stable states, said means when in a first one of said states indicating said first condition, and indicating said second condition when in the other one of said states;

an output means capable of assuming either one of two stable states, said output means reflecting the same condition as said control means by being in said respective states;

time means conditionally operable to generate a timed signal of a determinable duration, said duration being at least as great as the length of time within which noise may appear with a signal from said signal line means;

means responsive to said time means and to said signal line means to set said control means into said first state in response to the absence of said timed signal concurrently with the presence of said first signal;

means responsive to said control means being in said first state and said output means being in said second state, concurrently, to cause said time means to generate said timed signal;

and means responsive to said control means and to said time means and operative in response to said control means being in said first state concurrently with the presence of said timed signal to set said output means into a first one of said stable states, thereby generating an output signal from said apparatus indicative of said first condition.

2. A control apparatus for a temporarily noisy signal line, comprising:

a signal line means for presenting a first signal in dependence upon a first condition and a second signal in dependence upon a second condition;

a control means capable of assuming either one of two stable states, said means when in a first one of said states indicating said first condition, and indicating said second condition when in the other one of said states;

an output means capable of assuming either one of two stable states, said output means reflecting the same condition as said control means by being in said respective states;

time means conditionally operable to generate a timed signal of a determinable duration, said duration being at least as great as the length of time within which noise may appear with a signal from said signal line means;

means responsive to said time means and to said signal line means to set said control means into said first state in response to the absence of said timed signal concurrently with the presence of said first signal;

means responsive to said control means being in said first state and said output means being in said second state, concurrently, to cause said time means to generate said timed signal;

means responsive to said control means and to said time means and operative in response to said control means being in said first state concurrently with the presence of said timed signal to set said output means into a first one of said stable states, thereby generating an output signal from said apparatus indicative of said first condition;

means responsive to said time means and to said signal line means for setting said control means into the second one of said states in response to the presence of said second signal concurrently with the absence of said timed signal;

means responsive to said control means being in said second state and said output means being in said first state to cause said time means to generate said timed signal;

and means responsive to said control means and to said time means to reset said output means in response to said control means being in said second state concurrently with the presence of said timed signal.

3. A control apparatus for a cam contact, comprising:

a cam means for generating a first cam signal in dependence upon a first condition of a cam contact associated with said cam means and a second cam signal in dependence upon a second condition of said contact;

an output means capable of assuming either one of two stable states, said means when in a first one of said states indicating that said normally open cam contact is closed, and indicating said contact is open when in the other one of said states;

a control means capable of assuming either one of two stable states, said control means when in a first one of said states indicating that said normally open cam contact is closed, and indicating said contact is open when in the other one of said states;

time means conditionally operable as a function of the states of said output means and said control means to generate a timed signal of a determinable duration, said duration being at least as great as the length of time within which noise may appear from said cam means as a result of the opening or closing of a contact thereof;

means responsive to said time means and to said cam means to set said control means into said first state in response to the absence of said timed signal concurrently with the presence of said first cam signal;

and means responsive to said control means and to said time means and operative in response to said control means being in said first state concurrently with the presence of said timed signal to set said output means into a first one of said stable states, thereby generating an output signal from said apparatus indicative of said first condition.

4. A control apparatus for a cam contact, comprising:

a cam means for generating a first cam signal in dependence upon a first condition of a cam contact associated with said cam means and a second cam signal in dependence upon a second condition of said contact;

a control means capable of assuming either one of two stable states, said means when in a first one of said states indicating that said normally open cam contact is closed, and indicating said contact is open when in the other one of said states;

an output means capable of assuming either one of two stable states, said output means reflecting the same condition as said control means by being in said respective states;

time means conditionally operable to generate a timed signal of a determinable duration, said duration being at least as great as the length of time within which noise may appear on the contacts of said cam as a result of the opening or closing thereof;

means responsive to said time means and to said cam means to set said control means into said first state in response to the absence of said timed signal concurrently with the presence of said first cam signal;

means responsive to said control means being in said first state and said output means being in said second state, concurrently, to cause said time means to generate said timed signal;

means responsive to said control means and to said time means and operative in response to said control means being in said first state concurrently with the presence of said timed signal to set said output means into a first one of said stable states, thereby generating an output signal from said apparatus indicative of the fact that said cam contact is closed;

means responsive to said time means and to said cam means for setting said control means into the second one of said states in response to the presence of said second cam signal concurrently with the absence of said timed signal;

means responsive to said control means being in said second state and said output means being in said first state to cause said time means to generate said timed signal;

and means responsive to said control means and to said time means to reset said output means in response to said control means being in said second state concurrently with the presence of said timed signal.

5. A control apparatus for a cam contact, comprising:

a cam having a normally-open contact and a normally-closed contact, a control means capable of assuming either one of two stable states, said means when in a first one of said states indicating that said normally-open cam contact is closed, and indicating said contact is open when in the other one of said states;

an output means capable of assuming either one of two stable states, said output means reflecting the same condition as said control means by being in said respective states;

time means conditionally operable to generate a timed signal of a determinable duration, said duration being at least as great as the length of time within which noise may appear on the contacts of said cam as a result of the opening or closing thereof;

means responsive to said time means and to said normally open contact to set said control means into said first state in response to the absence of said timed signal concurrently with the closing of said contact;

means responsive to said control means being in said first state and said output means being in said second state, concurrently, to cause said time means to generate said timed signal;

and means responsive to said control means and to said time means and operative in response to said control means being in said first state concurrently with the presence of said timed signal to set said output means into a first one of said stable states, thereby generating an output signal from said apparatus indicative of the fact that said cam contact is closed.

6. A control apparatus for a cam contact, comprising:

a cam having a normally open contact and a normally-closed contact;

a control means capable assuming either one of two stable states, said means when in a first one of said states indicating that said normally-open cam contact is closed, and indicating said contact is open when in the other one of said states;

an output means capable of assuming either one of two stable states, said output means reflecting the same condition as said control means by being in said respective states;

time means conditionally operable to generate a timed signal of a determinable duration, said duration being at least as great as the length of time within which noise may appear on the contacts of said cam as a result of the opening or closing thereof;

means responsive to said time means and to said normally open contact to set said control means into said first state in response to the absence of said timed signal concurrently with the closing of said contact;

means responsive to said control means being in said first state and said output means being in said second state, concurrently, to cause said time means to generate said timed signal;

means responsive to said control means and to said time means and operative in response to said control means being in said first state concurrently with the presence of said timed signal to set said output means into a first one of said stable states, thereby generating an output signal from said apparatus indicative of the fact that said cam contact is closed;

means responsive to said time means and to said normally closed contact for setting said control means into the second one of said states in response to the closing of said contact concurrently with the absence of said timed signal;

means responsive to said control means being in said second state and said output means being in said first state to cause said time means to generate said timed signal;

and means responsive to said control means and to said time means to reset said output means in response to said control means being in said second state concurrently with the presence of said timed signal.

7. A control apparatus for a cam contact, comprising:

a cam having a normally-open contact and a normally-closed contact;

a source of a sequence of timing signals;

a control means capable of assuming either one of two stable states, said means when in a first one of said states indicating that said normally-open cam contact is closed, and indicating said contact is open when in the other one of said states;

an output means capable of assuming either one of two stable states, said output means reflecting the same condition as said control means by being in said respective states;

time means conditionally operable to generate a timed signal of a determinable duration, said duration being at least as great as the length of time within which noise may appear on the contacts of said cam as a result of the opening or closing thereof;

means responsive to a first timing signal and to said time means and said normally open contact to set said control means into said first state in response to the absence of said timed signal concurrently with the closing of said contact;

means responsive to a second timing signal and to said control means being in said first state concurrently with said output means being in said second state to cause said time means to generate said timed signal;

and means responsive to a third timing signal and to said control means and said time means and operative in response to said control means being in said first state concurrently with the presence of said timed signal to set output means into a first one of said stable states, thereby generating an output signal from said apparatus indicative of the fact that said cam contact is closed.

8. A control apparatus for a cam contact, comprising:

a cam having a normally-open contact and a normally closed contact;

a source of a sequence of timing signals;

a cantrol means capable of assuming either one of two stable states, said means when in a first one of said states indicating that said normally open cam contact is closed, and indicating said contact is open when in the other one of said states;

an output means capable of assuming either one of two stable states, said output means reflecting the same condition as said control means by being in said respective states;

time means conditionally operable to generate a timed signal of a determinable duration, said duration being at least as great as the length of time within which noise may appear on the contacts of said cam as a result of the opening or closing thereof;

means responsive to a first timing signal and to said time means and said normally open contact to set said control means into said first state in response to the absence of said timed signal concurrently with the closing of said contact;

means responsive to a second timing signal and to said control means being in said first state concurrently with said output means being in said second state to cause said time means to generate said timed signal;

means responsive to a third timing signal and to said control means and said time means and operative in response to said control means being in said first state concurrently with the presence of said timed signal to set said output means into a first one of said stable states, thereby generating an output signal from said apparatus indicative of the fact that said cam contact is closed.

means responsive to a fourth timing signal and to said time means and said normally closed contact for setting said control means into said second state in response to the closing of said contact concurrently with the absence of said timed signal.

means responsive to a fifth timing signal and to said control means being in said second state concurrently with said output means being in said first state to cause said time means to generate said timed signal;

and means responsive to a sixth timing signal and to said control means and said time means to reset said output means in response to said control means being in said second state concurrently with the presence of said timed signal.

9. A control apparatus for a noisy signal line, comprising:

a cam means for generating a first cam signal in dependence upon a first condition of a cam contact associated with said cam means and a second cam signal in dependence upon a second condition of said contact;

a control means capable of assuming either one of two stable states, said means when in a first one of said states indicating a first signal condition of said line, and indicating a second signal condition of said line when in the other one of said states;

an output means capable of assuming either one of two stable states, said output means reflecting the same condition as said control means by being in said respective states;

time means conditionally operable to generate a timed signal of a determinable duration, said duration being at least s great as the length of time within which noise my appear on the contacts of said cam as a result of the opening or closing thereof;

isolation means responsive to said control means being in said first state and said output means being in said second state, concurrently, to assume a given state, said isolation means when in said given state isolating said control means from said line;

means responsive to said isolation means and to said line means to set said control means into said first state in response to the absence of said first signal condition concurrently with said isolation means being in other than said given state;

and means responsive to said control means and to said isolation means and operative in response to said control means being in said first state concurrently with said isolation means being in said given state to set said output means into a first one of said stable states, thereby generating an output signal from said apparatus indicative of said first signal condition on said line.

10. A control apparatus for a noisy signal line, comprising:

a cam means for generating a first cam signal in dependence upon a first condition of a cam contact associated with said cam means and a second cam signal in dependence upon a second condition of said contact;

a control means capable of assuming either one of two stable states, said means when in a first one of said states indicating a first signal condition of said line, and indicating a second signal condition of said line when in the other one of said states;

an output means capable of assuming either one of two stable states, said output means reflecting the same condition as said control means by being in said respective states;

time means conditionally operable to generate a timed signal of a determinable duration, said duration being at least as great as the length of time within which noise may appear on the contacts of said cam as a result of the opening or closing thereof;

isolation means responsive to said control means being in said first state and said output means being in said second state, concurrently, to assume a given state, said isolation means when in said given state isolating said control means from said line;

means responsive to said isolation means and to said line means to set said control means into said first state in response to the absence of said first signal condition concurrently with said isolation means being in other than said given state;

means responsive to said control means and to said isolation means and operative in response to said control means being in said first state concurrently with said isolation means being in said given state to set said output means into a first one of said stable states, thereby generating an output signal from said apparatus indicative of said first signal condition on said line;

means responsive to said isolation means and to line for setting said control means into the second one of said states in response to said isolation means being in other than said given state concurrently with said second signal condition obtained on said line;

said isolation means assuming said given condition in response to said control means being in said second state and said output means being in said first state;

and means responsive to said control means and to said isolation means to reset said output means in response to said control means being in said second state concurrently with said isolation means being in said given state.

References Cited

UNITED STATES PATENTS

| | | | |
|---|---|---|---|
| 3,230,394 | 1/1966 | Kintner | 307—88.5 |
| 3,324,306 | 6/1967 | Lockwood | 307—88.5 |

ORIS L. RADER, *Primary Examiner.*

W. E. DUNCANSON, *Assistant Examiner.*